US009313453B2

(12) United States Patent
El-Solh et al.

(10) Patent No.: US 9,313,453 B2
(45) Date of Patent: Apr. 12, 2016

(54) LOCALIZATION ALGORITHM FOR CONFERENCING

(71) Applicants: Abdel-Aziz El-Solh, Ottawa (CA); Mirjana Popovic-Lavrinsek, Ottawa (CA)

(72) Inventors: Abdel-Aziz El-Solh, Ottawa (CA); Mirjana Popovic-Lavrinsek, Ottawa (CA)

(73) Assignee: Mitel Networks Corporation, Ottawa (CA)

(*) Notice: Subject to any disclaimer, the term of this patent is extended or adjusted under 35 U.S.C. 154(b) by 140 days.

(21) Appl. No.: 13/738,052

(22) Filed: Jan. 10, 2013

(65) Prior Publication Data
US 2014/0049596 A1 Feb. 20, 2014

Related U.S. Application Data

(60) Provisional application No. 61/742,879, filed on Aug. 20, 2012.

(51) Int. Cl.
H04N 7/14 (2006.01)
H04N 7/15 (2006.01)
H04R 27/00 (2006.01)
H04R 1/40 (2006.01)

(52) U.S. Cl.
CPC ............... H04N 7/15 (2013.01); H04R 1/406 (2013.01); H04R 27/00 (2013.01); H04R 2227/001 (2013.01); H04R 2430/03 (2013.01)

(58) Field of Classification Search
None
See application file for complete search history.

(56) References Cited

U.S. PATENT DOCUMENTS

| 6,198,693 | B1 | 3/2001 | Marash | |
|---|---|---|---|---|
| 7,970,151 | B2* | 6/2011 | Oxford | H04M 1/6008 381/122 |
| 2003/0051532 | A1 | 3/2003 | Beaucoup | |
| 2003/0118200 | A1 | 6/2003 | Beaucoup | |
| 2005/0201024 | A1* | 9/2005 | Gill | B82Y 25/00 360/324.12 |
| 2005/0201204 | A1* | 9/2005 | Dedieu | G01S 3/8006 367/118 |
| 2007/0093714 | A1 | 4/2007 | Beaucoup | |
| 2007/0160240 | A1* | 7/2007 | Ito | H04S 7/303 381/300 |
| 2012/0328121 | A1* | 12/2012 | Truman | G10L 21/038 381/94.3 |
| 2013/0148821 | A1* | 6/2013 | Sorensen | H04M 9/082 381/80 |

FOREIGN PATENT DOCUMENTS

EP 1705911 A1 9/2006

* cited by examiner

Primary Examiner — Maria El-Zoobi

(57) ABSTRACT

A conferencing device and method of talker localization for steering a plurality of sensors arranged in sectors around a housing to a current active direction beam. A beamformer is implemented for determining a loudest sector based on signals from the sensors. In the event the loudest sector persists for a first duration then forming signal beams from sensor signals in the loudest sector and a plurality of adjacent sectors over a further duration to create respective signal beam envelopes. Then selecting a highest energy of the beam envelopes to be a loudest non-active beam and comparing the loudest non-active beam to the current active direction beam. If the highest energy one of the beams is greater than the energy of the current active direction beam by a threshold, then selecting the highest energy one of the beams to be the current active direction beam and directing the sensors thereto.

20 Claims, 4 Drawing Sheets

LOCALIZATION ALGORITHM FOR CONFERENCING

CROSS-REFERENCE TO RELATED APPLICATIONS AND CLAIM OF PRIORITY

Priority of U.S. Provisional Patent Application Ser. No. 61/742,879 filed on Aug. 20, 2012 is hereby claimed.

FIELD OF INVENTION

The present invention relates generally to conferencing and specifically to beam forming localization techniques.

BACKGROUND OF THE INVENTION

One of the challenges in designing a conferencing device is to ensure that a talker's voice will be detected and captured regardless of the talker's location relative to the device. For example, it is common for devices that incorporate non directional microphones to pick up room reverberation that obscures the voice of the talker. In conferencing devices having multiple microphones, it is conventional to rely on either directional microphones for talker localization or a full set of beam formers to isolate the active talker. For example, the UC360 Collaboration Point conferencing unit manufactured by Mitel Networks Corporation creates beams in multiple directions, as set forth, for example in U.S. Pat. No. 7,130,797, assigned to Mitel Networks Corporation, the contents of which are incorporated herein by reference.

Although beam forming techniques can be used for talker localization, beam forming requires the use of a filter for each microphone as well as a summer to mix the multiple microphone signals. For example, in a conferencing device having sixteen supported sectors there is a requirement for sixteen microphones and associated filters, which results in the wideband audio processing requirements becoming very large. Also, the asymmetric design of some conferencing devices can result in cavities that give rise to poor separation between sectors with the result that even when beam forming is used, the beam responses between adjacent sectors may overlap (and interfere with one another) significantly in certain frequency bands (e.g. between 600 Hz and 1450 Hz).

Non-symmetry of the device design, increased wideband audio processing requirements and increased sector count can result in a computational load that is too large to be handled efficiently or economically.

BRIEF INTRODUCTION TO THE DRAWINGS

Features and advantages of the invention will be apparent from the detailed description which follows, taken in conjunction with the accompanying drawings, which together illustrate, by way of example, features of the invention; and, wherein.

Figure 2:
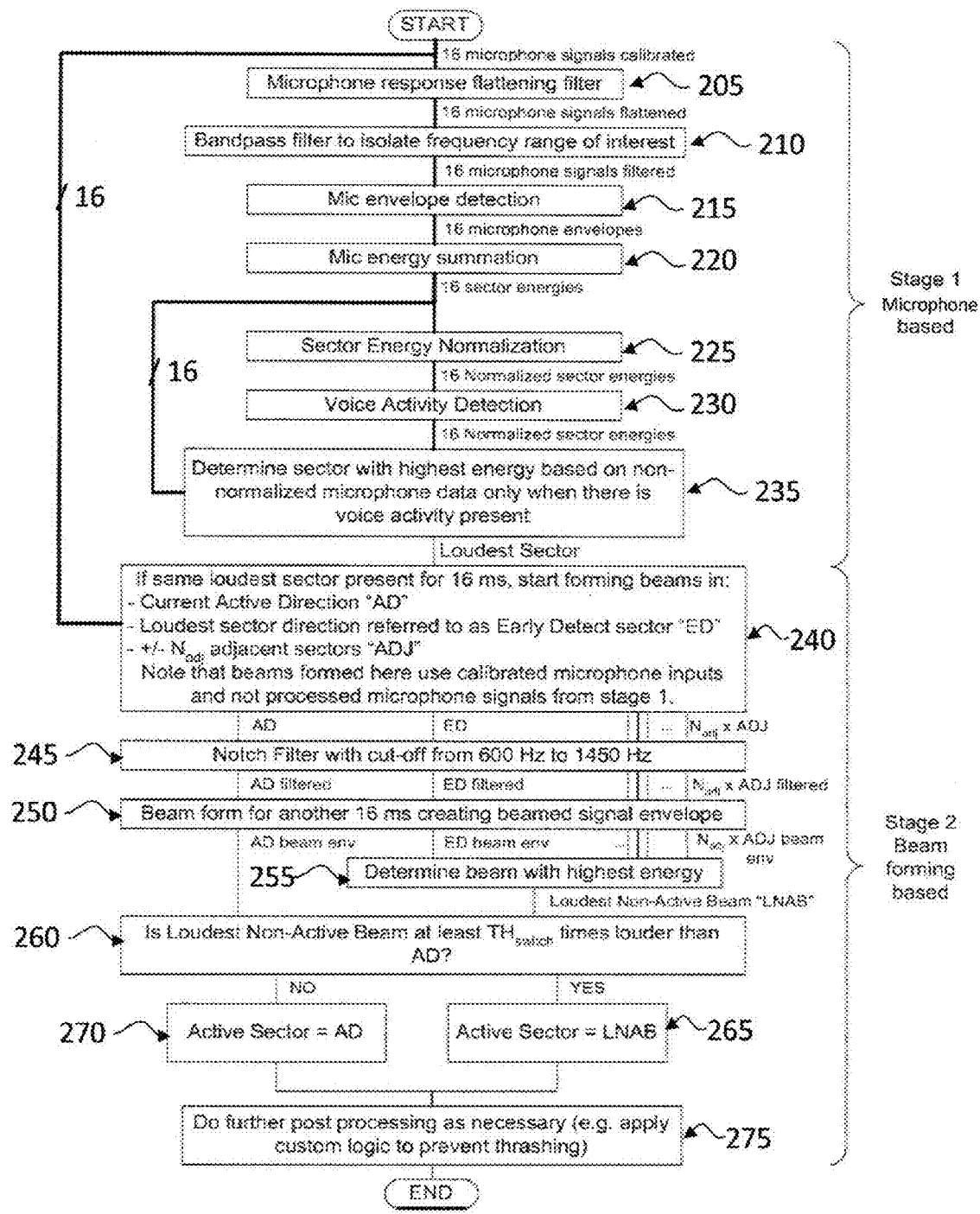
FIG. 2 is a flowchart of a method of beam forming localization according to an embodiment of the invention.
Figure 3:
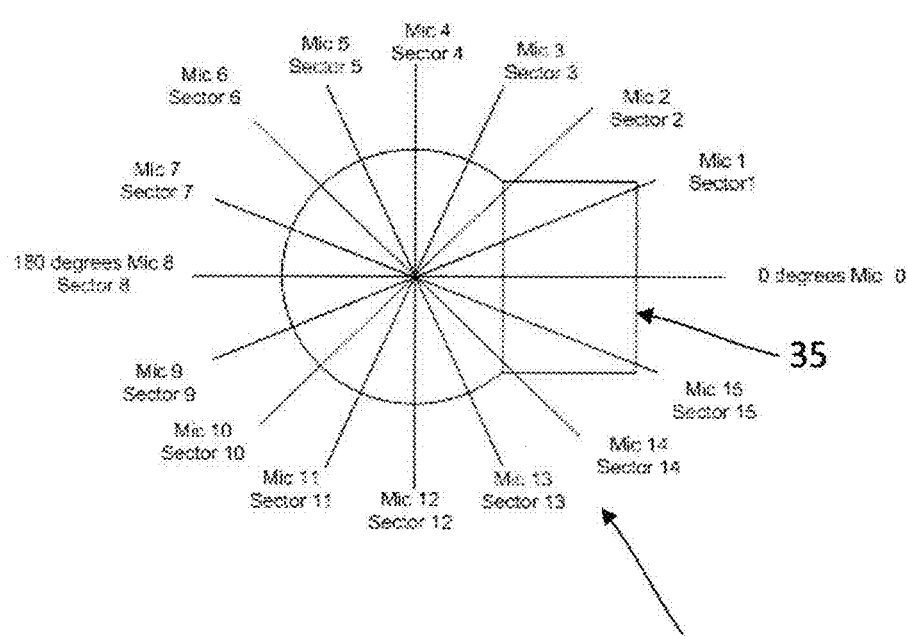
FIG. 3 is a plan view of an exemplary conferencing device illustrating microphone and sector layout.
Figure 4:
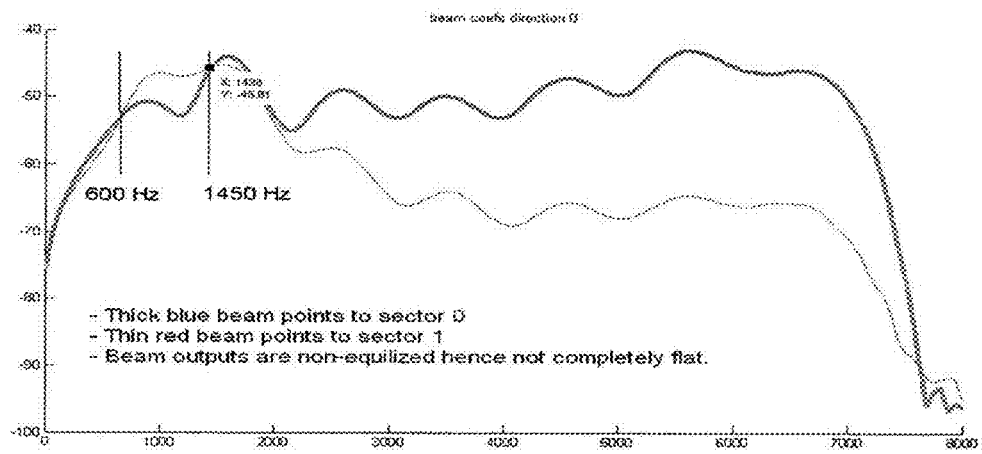
Figure 5:
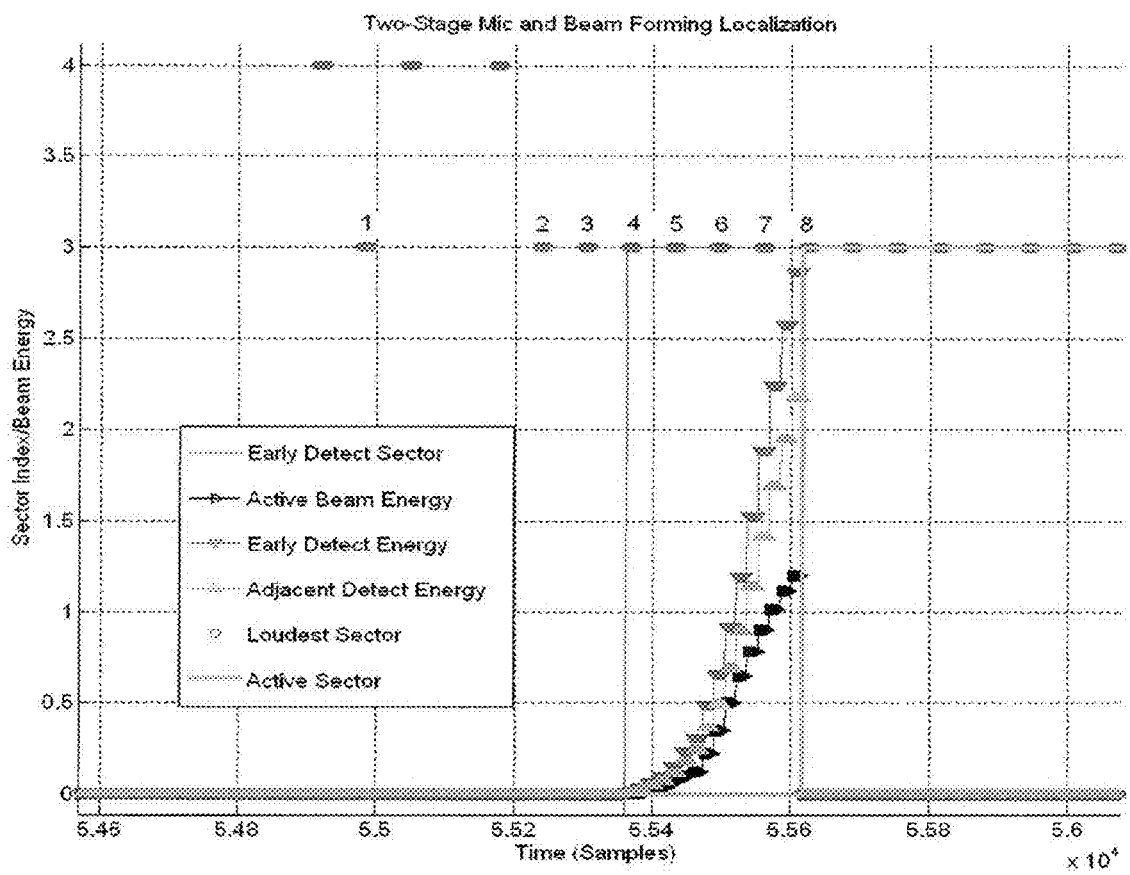

FIG. 4 is a graph comparing beam responses for sector 0 and sector 1 of the conferencing device shown in FIG. 3, when the talker is in sector 0; and FIG. 5 is a graph depicting test results of the method steps shown in FIG. 2 on the device of FIG. 3, where the localizer was initially pointing to sector 0 and a talker starts talking in sector 3.

DETAILED DESCRIPTION OF EXAMPLE EMBODIMENTS

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment", "in an embodiment" or "according to an exemplary embodiment" in various places throughout this specification are not necessarily all referring to the same embodiment.

Furthermore, the described features, structures, or characteristics may be combined in any suitable manner in one or more embodiments. In the following description, numerous specific details are provided for a thorough understanding of embodiments of the invention. One skilled in the relevant art will recognize, however, that the invention can be practiced without one or more of the specific details, or with other methods, components, materials, etc. In other instances, wellknown structures, materials, or operations are not shown or described in detail to avoid obscuring aspects of the invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Figure 1:
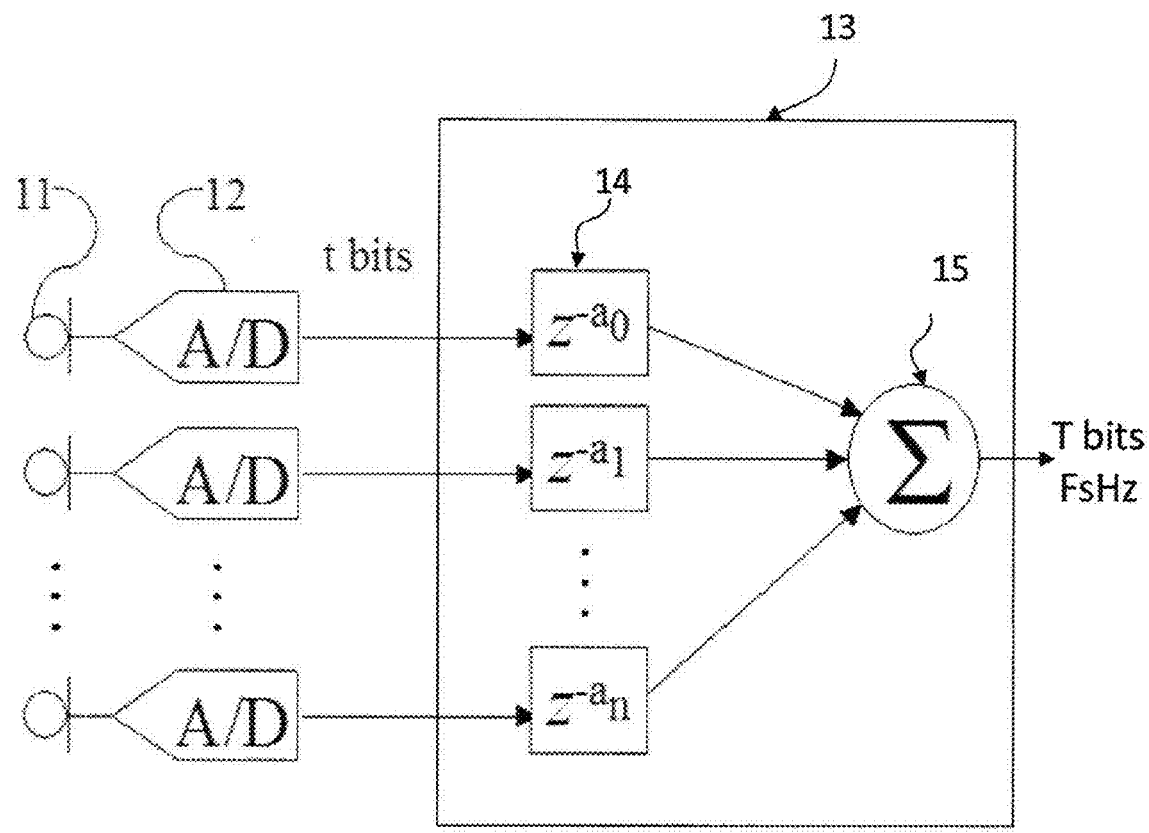
FIG. 1 is a block diagram of a conventional beam forming conferencing device.

FIG. 1 is a block diagram of a conventional beam forming conferencing device 10 having a plurality of sensors, such as microphones 11, arranged in spaced relationship around a housing of the device. Sound received by the microphones 11 is digitised via analogue-to-digital converter modules 12 and then "steered" by "phasing" the digitized signals using beamformer module 13 comprising a plurality of filters 14 and a summer 15 to obtain a broadside beam that is perpendicular to the array. The beam forming conferencing device 10 depicted in FIG. 1 is commonly referred to as a "delay and sum" beam former. The beam width is dependent on the wavelength ($\lambda$), the inter-element spacing (d) between microphones 11 and the number of microphones (n). The steering angle ($\theta$) is determined by the inter-microphone delay ($\tau$), the speed of the sound wave (c) and the inter-element spacing (d), as follows:

$$\sin \theta = c\tau/d.$$

According to an aspect of the present invention, talker localization is provided by combining both microphone and beam forming techniques. The exemplary method employs a hybrid microphone and beam forming localization technique that benefits from the lower computational load associated with microphone localization as well as the increased accuracy and reliability of beam forming localization.

As discussed in greater detail below, according to an exemplary embodiment, a two-stage localization scheme is provided that uses microphone signal averaging to determine the approximate location of a talker (referred to as the "coarse direction"). Next, beams are created in the coarse direction to provide sufficient resolution to select a single sector where the talker is located (referred to as the "fine direction"). In one embodiment, where asymmetrical device design results in neighboring beam interference, the beams are then filtered to substantially remove energies between 600 Hz and 1450 Hz. However, it should be noted that filtering between 600 Hz and 1450 Hz is specific to one mechanical design and any filtering frequency may be used. Other devices may have other areas of interference that require different filters.

An exemplary two-stage hybrid microphone and beam forming localization method of the present invention is depicted in FIG. 2, for operation with the of an exemplary conferencing device 30 shown in FIG. 3, wherein a plurality of microphones (Mic 0, Mic 1 . . . Mic 15) are arranged in spaced relationship around a housing 35 of the device. The number of microphones used in the embodiment of FIGS. 2 and 3 is sixteen and the number of sectors is also sixteen. However, a person of skill in the art will understand that the illustrated method may be applied to other devices embodiments with different numbers of microphones or that support different numbers of sectors.

The method of FIG. 2 is divided into two parts: microphone processing to determine the loudest sector (referred to herein as Stage 1) and beam forming to determine the active sector (referred to herein as Stage 2), Thus, Stage 1 provides the "coarse direction" of the talker while Stage 2 provides the "fine direction."

In Stage 1, the sector having the loudest energy is determined based on a microphone envelope and averaging technique. First, each microphone 11 is filtered using a flattening filter (step 205) to combat reverberation and non-symmetry of the device 30 (i.e. the plan view of the device in FIG. 3 shows that it is of asymmetrical design). The flattening filters function as limiters to effectively minimize significant peaks and/or troughs in the frequency response of each microphone given a source that is in front of each microphone. They are designed by creating an inverse magnitude filter for each microphone frequency response and then offsetting the filter gain by the average energy of the microphone response. The microphone response is obtained from an acoustic simulation using the physical structure of the device 30 and a sound source that, in one embodiment, is a sweep of tones simulated to be two meters away from the device and at an angle of 20 degrees upward from horizontal and in front of each microphone. Thus, each microphone 11 is assigned a flattening filter based on a sound source placed in front of it.

Next, each microphone signal is filtered using a bandpass filter (step 210) to isolate a frequency band of interest. Step 210 effectively filters out low frequency and high frequency noise and focuses the microphone processing only on the active speech band. In the illustrated embodiment of FIG. 3, the pass and of the filter was from 1450 Hz to 3900 Hz, where the lower cut-off frequency of 1450 Hz was selected to eliminate 1000 Hz resonance resulting from a cavity under the screen (not shown). Other frequency bands may be chosen to suit particular physical design features of the device 30.

Microphone envelopes are detected and energy summation is effected at steps 215 and 220 to determine sector energies. The energy-per-sector around the device 30 is calculated by summing together adjacent microphone energies as well as one rear microphone (to compensate for non-symmetry effects of the device design in FIG. 3). In the specific implementation of FIGS. 2 and 3, +/−2 microphones were summed with the rear microphone (i.e. Mic 8 in FIG. 3). In the exemplary embodiment, the rear microphone signal (Mic 8) was multiplied by a weighting factor before being summed with the other microphone signals. The value of the weighting factor can be tuned as necessary for different implementations. For example, with sixteen microphones around the device 30 (i.e. Mic. 0, Mic. 1, Mic. 2, . . . Mic. 15), in order to calculate microphone energy summation for sector 0, microphones 2,1,0,15,14 and half the energy of Mic. 8 are summed together.

Step 225 normalizes the energies of each microphone summation (i.e. each sector) in order to perform reliable voice activity detection (VAD) in step 230. The output of step 230 limits the algorithm to determining loudest sector only when voice activity (i.e. speech) is present since detection on signals that are not speech (i.e. noise) is unreliable.

Finally, at step 235, the loudest sector is determined from speech signal based on steps 220 and 230. Specifically, the microphone energy summation step 220 and voice activity detection (VAD) step 230 are both required to determine the sector having the highest energy. The VAD step 230 limits operation of the highest energy calculation mechanism to sections of audio having speech.

Therefore, Stage 1 of the method set forth in FIG. 2 outputs the sector having the loudest energy. That is, Stage 1 outputs a coarse direction estimate of which sector the talker is located in (i.e. Loudest Sector).

Stage 2 outputs the "fine direction" of the talker by forming several beams, as follows: 1) a beam in the current Active Direction (AD) sector; 2) a beam in the estimated Early Detect (ED) sector; and 3) a plurality (+/−$N_{adj}$) of Adjacent (ADJ) sectors, as described below. According to the exemplary embodiment, the plurality (+/−$N_{adj}$) of Adjacent (ADJ) sectors is ED minus one, for sectors less than 180 degrees (horizontal) from the front of the unit as shown in FIG. 3, and ED plus 1, for sectors larger than 180 degrees from the front of the unit. However, a person of skill in the art will understand that the number of ADJ sectors can be changed to be plus or minus any number of adjacent beams. For example, according to an alternative embodiment, $N_{adj}$ can be ED+/−1 in order to cover the two neighboring sectors of the Early Detect (ED) sector.

Thus, at step 240, according to the exemplary embodiment the AD, ED and $N_{adj}$×ADJ beams are generated using calibrated microphone signals from Mic 0, Mic 1, etc. (i.e. absent the microphone signal processing of Stage 1) provided the Loudest Sector from Stage 1 persists for at least 16 ms, in order to allow the beam forming filters enough time to stabilize.

As discussed above, in the particular physical design of the device 30 in the embodiment of FIG. 3, a cavity exists under a screen of the device, such that beams pointing under the screen significant overlap one another in certain frequency bands. In the illustrated embodiment, these overlaps are only detrimental between the frequency range of 600 Hz and 1450 Hz. Hence according to the exemplary embodiment, each of the AD, ED and $N_{adj}$×ADJ beams is filtered using a band stop (i.e. notch) filter applied at step 245 in order to remove the problematic frequency band. FIG. 4 demonstrates the overlap between sectors 0 and 1 when the talker is in sector 0, from which it will be noted that sector 1 energy interferes with sector 0 energies between 600 Hz and 1450 Hz.

Beam energies are calculated at step 250 by taking an envelope of the beam signal and then summing all envelopes together over a 16 ms window, according to the "delay and sum" algorithm discussed above in connection with FIG. 1. For the exemplary embodiment, a 16 ms window was used, however in different implementations the duration of the collection window may change according to the type of beam filters used. Hence, the beam energies increment throughout Stage 2, but depending on the envelope will increment at different rates such that the beam envelope in the entire 16 ms window can be taken in to consideration when determining loudest beam energy (i.e. not restricted to what the envelope is at the end of the 16 ms window).

At the end of the beam collection window (16 ms) the ED and N×ADJ beam energies are compared and, at step 255, the beam with maximum energy is chosen as the potential new active sector (i.e. the Loudest Non-Active Beam (LNAB)).

In order to ensure resiliency to reverberation and non-symmetry effects of the device, at step 260 the LNAB is only declared to be the new active direction at step 265 if it has more than a threshold amount of energy ($TH_{switch}$) above the current Active Direction (AD). Otherwise, the active sector remains unchanged (step 270). According to the exemplary embodiment, the threshold was chosen to be 1.3 times greater (or 2.7 dB). However, a person of skill in the art will understand that the threshold $TH_{switch}$ can be tuned as necessary for different implementations.

To the extent necessary, additional signal processing is performed on the selected microphone beam (step 275). For example, de-bounce logic may be used to keep the active sector consistently pointing at the talker and prevent it from switching to an adjacent sector then back in the event of "thrashing" behaviour of the LNAB and/or AD due to acoustic effects. For example, hold-over counters and state machines may be used to prevent thrashing. Other forms of signal post processing may be employed to address additional issues.

FIG. 5 shows examples of the signals from Stages 1 and 2 of FIG. 2, according to the exemplary embodiment, where only three total beams are used, such that the beams formed in Stage 2 are AD, ED and only one ADJ. However, a person of skill in the art will understand that the number of ADJ sectors can be changed as necessary.

In the specific scenario of FIG. 5, the conference unit 30 is initially pointing to sector 0 (i.e. AD is sector 0) and a talker then starts talking within sector 3. Each of the blue group of circles represents a 4 ms chunk of time. Hence 16 ms elapses after 4 groups of blue in the same sector have passed by. Likewise. 32 ms is indicated by eight groups of blue circles. In the scenario of FIG. 5, the algorithm waits until a loudest sector (based only on microphone energies) is detected four times (i.e. a count of 4 indicating 16 ms), Then, three beams are created as follows: the first beam points at sector 0 (AD beam), the second beam points at sector 3 (ED beam) and the third beam points at sector 2 (the chosen ADJ direction in the illustrated sample implementation). Envelopes of the three beams are then calculated at step 250 to arrive at an estimate of their energies. These energies are then summed for the next 16 ms (4 groups of blue circles).

As discussed above, before the AD, ED and ADJ beams are formed, the loudest sector must have been detected for 16 ms. However, the 16 ms of loudest sector detection need not be consecutive. The localizer state machine of the exemplary embodiment discussed above in connection with FIG. 2 operates in chunks of 4 ms. Once four 4 ms chunks have been counted, beam forming begins. However, once beam forming does begin, it persists for 16 ms (i.e. four consecutive 4 ms chunks). Thus, with reference to FIG. 5, chunks 1 to 4 need not be consecutive whereas chunks 5 to 8 must be consecutive.

After collecting beam forming energy for 16 ms, the ED beam has more energy (i.e. is louder) than the ADJ beam and hence becomes the potential active sector at step 255 (i.e. Loudest Non-Active Beam (LNAB)). The ED beam is then compared to the AD beam (step 260) and found to be louder than 1.3 times the energy of the AD beam. Hence, the unit 30 switches direction and declares sector 3 as the new Active Direction (AD) at step 265.

Numerous modifications, variations and adaptations may be made to the particular embodiments described above without departing from the scope patent disclosure, which is defined in the claims.

What is claimed is:

1. A method of talker localization in a conferencing device for steering a plurality of sensors arranged in sectors around a housing of the device, the method comprising:
   initially having sensors steered to a current active direction;

determining a loudest sector by averaging signals from the sensors;

in the event that the loudest sector persists for a first duration:

forming at least three signal beams from sensor signals over a further duration, such that the first signal beam points at a sector including the current active direction, the second signal beam points at the loudest sector and the third and any subsequent signal beams point at one or more sectors adjacent to the loudest sector, but wherein not all sectors are pointed at by a corresponding signal beam, calculating respective beam envelopes of the at least three signal beams to estimate their energies; and selecting, from the signal beams pointing at the loudest sector and the one or more adjacent sectors, a highest energy one of the signal beams to be a loudest non-active beam;

comparing an energy of the loudest non-active beam to an energy of the signal beam pointing at the sector including the current active direction; and if the energy of the loudest non-active beam is greater than the energy of the signal beam pointing at the sector including the current active direction:

selecting the direction associated with the loudest non-active beam to be the current active direction, and steering the sensors to the current active direction.

2. The method of claim 1, further comprising filtering the signals from the sensors prior to determining the loudest sector.

3. The method of claim 2, comprising filtering using a flattening filter.

4. The method of claim 2, comprising filtering using a bandpass filter.

5. The method of claim 1, wherein averaging of signals from the sensors comprises summing together signal energies from adjacent sensors with one additional sensor to compensate for non-symmetry effects of the conferencing device.

6. The method of claim 5, further comprising performing voice activity detection prior to determining the loudest sector.

7. The method of claim 1, wherein the steps of selecting the direction associated with the loudest non-active beam to be the current active direction and steering the sensors to the current active direction, are performed only if the energy of the loudest non-active beam is greater than the energy of the signal beam pointing at the sector including the current active direction by a threshold amount.

8. A conferencing device comprising:

a housing;

a plurality of sensors arranged in sectors around the housing; and a beamformer for:

initially having sensors steered to a current active direction;

determining a loudest sector by averaging signals from the sensors; in the event that the loudest sector persists for a first duration:

forming at least three signal beams from sensor signals over a further duration, such that the first signal beam points at a sector including the current active direction, the second signal beam points at the loudest sector and the third and any subsequent signal beams point at one or more sectors adjacent to the loudest sector, but wherein not all sectors are pointed at by a corresponding signal beam, calculating respective beam envelopes of the at least three signal beams to estimate their energies; and selecting, from the signal beams pointing at the loudest sector and the one or more adjacent sectors, a highest energy one of the signal beams to be a loudest non-active beam;

comparing an energy of the loudest non-active beam to an energy of the signal beam pointing at the sector including the current active direction; and if the energy of the loudest non-active beam is greater than the energy of the signal beam pointing at the sector including the current active direction:

selecting the direction associated with the loudest non-active beam to be the current active direction; and steering the sensors to the current active direction.

9. The conferencing device of claim 8, further comprising a plurality of filters for filtering the signals from the sensors prior to determining the loudest sector.

10. The conferencing device of claim 9, wherein at least one of the filters is a flattening filter.

11. The conferencing device of claim 9, wherein at least one of the filters is a bandpass filter.

12. The conferencing device of claim 8, wherein the beamformer includes a summer for summing together signal energies from adjacent sensors with one additional sensor to compensate for non-symmetry effects of the conferencing device.

13. The conferencing device of claim 12 further comprising a voice activity detector for detecting voice activity prior to the beamformer determining the loudest sector.

14. The conferencing device of claim 8, wherein the first duration is sufficient to permit stabilized signal beam forming.

15. The conferencing device of claim 8, wherein said first duration and the further duration are equivalent.

16. The conferencing device of claim 8, further including a band stop filter for filtering the signal beams during the further duration.

17. The method of claim 7, wherein the threshold is at least 1.3.

18. The method of claim 1, wherein averaging signals from the sensors comprises a microphone envelope and averaging technique.

19. The conferencing device of claim 8, wherein the steps of selecting the direction associated with the loudest non-active beam to be the current active direction and steering the sensors to the current active direction, are performed only if the energy of the loudest non-active beam is greater than the energy of the signal beam pointing at the sector including the current active direction by a threshold amount.

20. The conferencing device of claim 19, wherein the threshold is at least 1.3.

* * * * *